Figure 1:
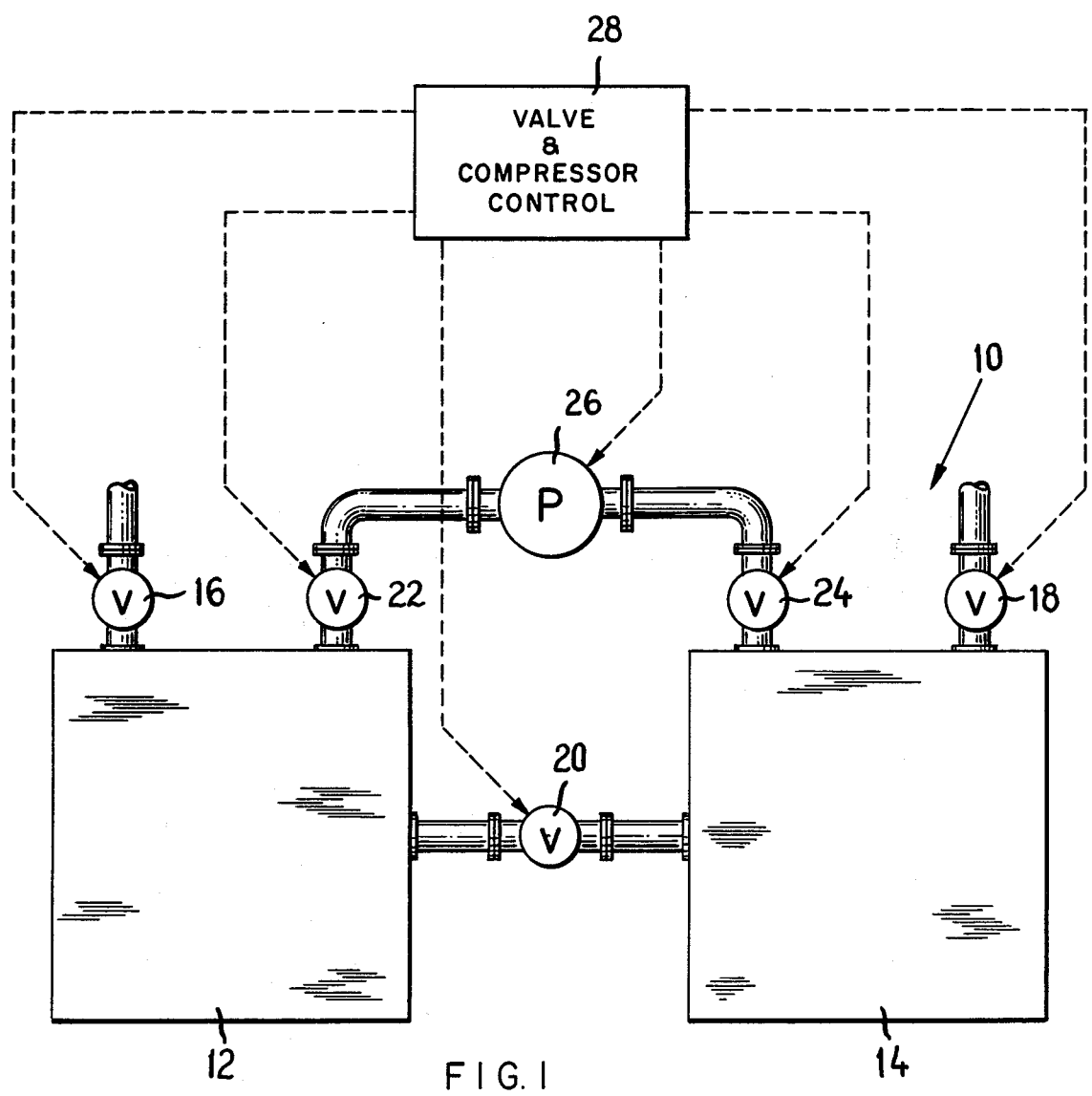

United States Patent [19]

Slocumb

[11] 4,150,077
[45] Apr. 17, 1979

[54] REDUCING THE AGING PERIOD OF GASEOUS EXPANSION AGENT FOAMS

[75] Inventor: Robert C. Slocumb, New Brighton, Minn.

[73] Assignee: Conwed Corporation, St. Paul, Minn.

[21] Appl. No.: 761,959

[22] Filed: Jan. 24, 1977

[51] Int. Cl.$^2$ ............................................. B29D 27/00
[52] U.S. Cl. ...................................... 264/53; 264/500; 264/DIG. 15
[58] Field of Search .................. 264/DIG. 15, 53, 51, 264/50, 88, 93

[56] References Cited

U.S. PATENT DOCUMENTS

| | | | |
|---|---|---|---|
| 2,787,809 | 4/1957 | Stastny | 264/DIG. 15 |
| 2,986,537 | 5/1961 | Chaumeton | 264/DIG. 15 |
| 2,998,396 | 8/1961 | Nickolls | 264/DIG. 15 |
| 3,126,432 | 3/1964 | Schuur | 264/DIG. 15 |
| 3,251,911 | 5/1966 | Hansen | 264/50 X |
| 3,413,387 | 11/1968 | Ohsol | 264/53 X |
| 3,427,371 | 2/1969 | Skinner | 264/50 X |
| 3,436,446 | 4/1969 | Angell | 264/50 X |
| 3,440,309 | 4/1969 | Breukink et al. | 264/53 |

Primary Examiner—Philip Anderson
Attorney, Agent, or Firm—Eyre, Mann, Lucas & Just

[57] ABSTRACT

Apparatus and method are disclosed for reducing the aging period of foams produced using a gaseous expansion agent. In accordance with the present invention the aging period for these foams is substantially reduced by subjecting the foam to pressure by a gas which is essentially inert with respect to the foam.

9 Claims, 2 Drawing Figures

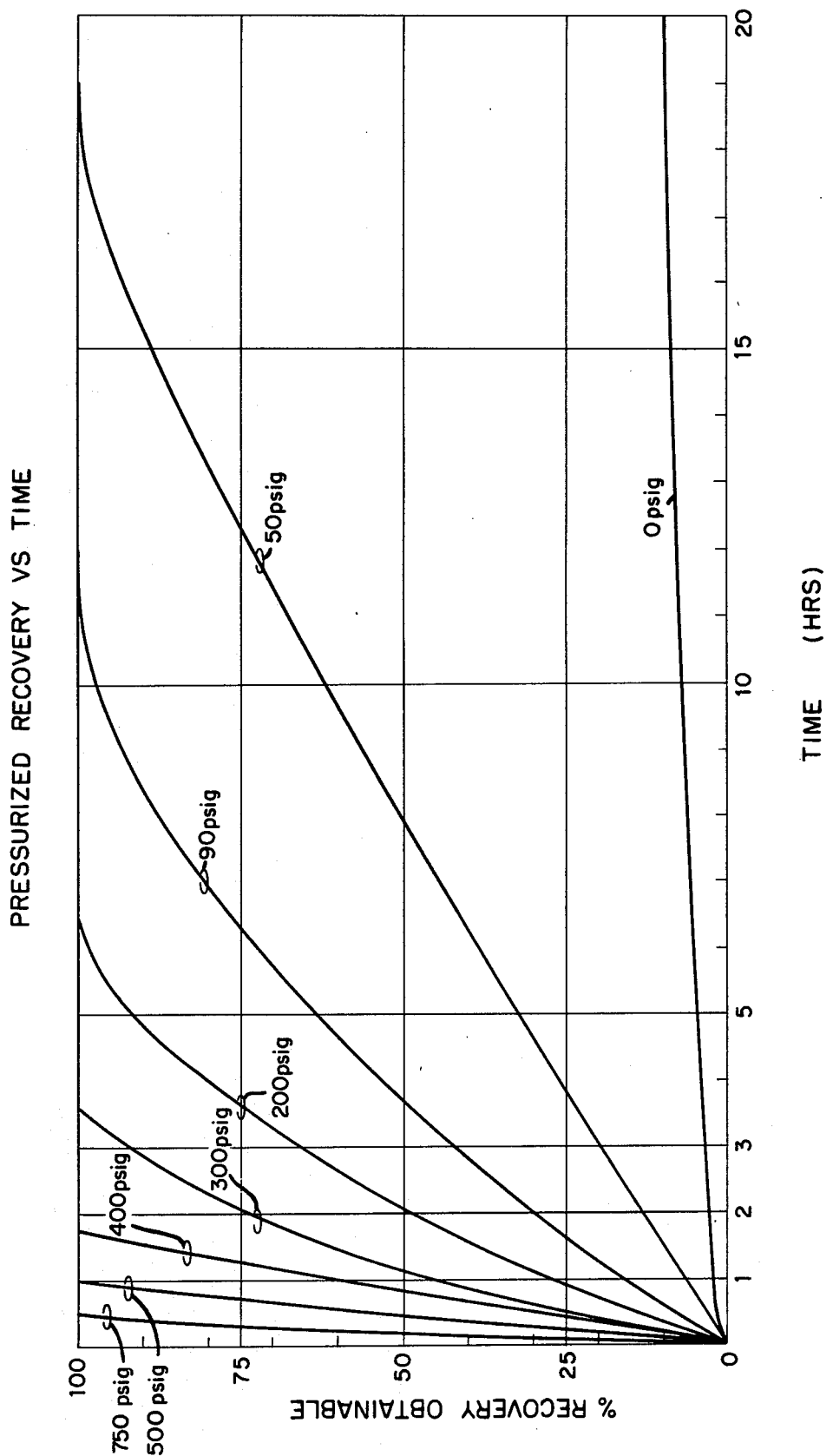

REDUCING THE AGING PERIOD OF GASEOUS EXPANSION AGENT FOAMS

The present invention relates to a method for reducing the aging period of foams produced using a gaseous expansion agent.

The production of foams is quite well known in the art. They are normally formed by injecting under pressure a volatile hydrocarbon, typically halogenated hydrocarbons into a molten resin, typically a polyolefin whereafter the mixture is extruded to ambient temperature. As the molten resin is extruded to ambient temperature, foaming of the resin mass takes place.

Due to the migration of the blowing agent (gaseous expansion agent) through the cell walls of the foam, the foam will usually shrink within about 24 hours. This shrinkage can be as high as 80% of the original foam volume depending upon the original foam density of the extruded material. If the thus shrunk foam is permitted to age, i.e., not used but rather stored in a room where air is available, the foam will recover approximately 90% to 95% or more of its original volume after a minimum of at least two weeks and this can take up to six weeks. It is quite apparent that this involves a substantial investment in terms of storage space, work in progress, and the like. If the foam is used without aging, it will expand in use and this can be very detrimental. For example, in a typical end use application as a mattress insulator, expansion will cause undesirable waves in the mattress resulting in noise, discomfort and unsightly appearance. Obviously any method which will reduce the aging period is highly desirable.

In accordance with the present invention, it has been found that the aging period for gaseous expansion agent foams can be substantially reduced by subjecting the foam to pressure. In the present invention the foam, typically a polyolefin, is subjected to a gas pressure of from about 50 to about 750 pounds per square inch gauge (psig), preferably from about 90 to about 500 psig for a period of from about 24 to about ½ hour, preferably from about 10 to about 1 hour with a gas which is essentially inert with respect to the foam, preferably air or nitrogen. The pressure is preferably exerted on the foam at gas and foam ambient temperature.

In accordance with the preferred embodiment of the method according to the invention, the aging period of polyethylene foam produced by extrusion of a polyethylene melt is reduced. The aging period of polyethylene foam is reduced by subjecting the foam to air pressurized to from about 50 to about 750 psig, preferably from about 90 to about 500 psig for from about 24 to about ½ hours, preferably from about 10 hours to about 1 hour at ambient air and foam temperature whereafter the foam is subjected to air at ambient pressure.

In accordance with the present invention, it is preferred to select a time-pressure combination which will result in 95% or greater recovery of foam volume. The reason for this is that ambient pressure aging of extruded foams proceeds very rapidly initially but slows considerably as the percent recovery increases. Therefore, a time-pressure combination which results in a percent recovery less than about 95% of that obtainable has the distinct disadvantage of leaving a relatively long period needed for post-pressurized recovery.

These and other advantages of the present invention may be more fully understood with respect to the drawings wherein:

FIG. 1 shows an apparatus suitable for carrying out the present invention; and
FIG. 2 shows a graph of pressurized recovery vs. time.

Referring first to FIG. 2 of the accompanying drawings, this is a graph which shows time vs. percent recovery obtainable for various pressures. The graph is not intended to be exact but is intended to show the approximate time needed for 95% or better recovery at various pressures. As can be seen from the graph, a time of about 12 hours is preferred for 90 psig while a time of about 1 hour is preferable for 500 psig.

Specific examples of the method according to the invention are set forth below. These examples are illustrative and are not to be understood as limiting the scope of the invention in any way.

EXAMPLES

A number of polyethylene foams were formed in known manner. Sample A was formed by extruding polyethylene resin having a melt index of 2.0, and Samples B and C were formed by extruding a blend of polyethylene resins having melt indices of 3.0 and 0.4 in the respective ratio by weight of 2/3:1/3. The thickness in inches of each of the shrunken samples was measured, this thickness being designated $T_o$ in the table below. Portions of each sample were subjected at ambient foam temperature to air pressurized to 90 psig and to 500 psig respectively. After 12 hours and 1 hour, respectively, the portions of each sample subjected to 90 psig and 500 psig air pressure respectively were removed to ambient air pressure and the thickness of each of the portions of the foam samples was measured, these thicknesses being designated $T_{P12}$ and $T_{P1}$ respectively, in the table below. Another portion of each sample was left at ambient air pressure at ambient foam temperature. The thickness of each of these portions of the foam samples was measured after 12 hours, this thickness being designated as $T_{12}$ in the table below.

It was observed over a period of weeks that there was no further change in the thickness of each of the portions subjected to treatment in accordance with the present invention, i.e., they were fully aged. On the other hand, the other portions which were left at ambient air pressure were observed to continue expanding for about four weeks. The final thickness for each sample is designated as $T_F$ in the table.

TABLE

| Sample | $T_o$ | $T_{12}$ | $T_{P1}$ | $T_{P12}$ | $T_F$ |
|---|---|---|---|---|---|
| A | 0.215 | 0.220 | | | 0.250 |
| A' | 0.215 | | 0.250 | | 0.250 |
| A" | 0.215 | | | 0.250 | 0.250 |
| B | 0.245 | 0.235 | | | 0.275 |
| B' | 0.245 | | 0.275 | | 0.275 |
| B" | 0.245 | | | 0.275 | 0.275 |
| C | 0.260 | 0.255 | | | 0.310 |
| C' | 0.260 | | 0.310 | | 0.310 |
| C" | 0.260 | | | 0.310 | 0.310 |

$T_o$ is thickness at extrusion
$T_{12}$ is thickness after 12 hours at ambient pressure
$T_{P1}$ is thickness after 1 hour at 500 psig pressure
$T_{P12}$ is thickness after 12 hours at 90 psig pressure
$T_F$ is thickness after four weeks The present invention is further embodied in and carried out by apparatus for reducing the aging period of gaseous expansion agent foams comprising at least two chambers, gas compression means and means for selectively communicating the chambers with the gas compression means, with each other and with the atmosphere.

FIG. 1 of the accompanying drawing shows diagramatically a preferred apparatus useful in reducing the aging period of foam made with a gaseous expansion agent and the apparatus is useful in carrying out the method according to the present invention.

Referring to the FIG. 1, a dual-chamber apparatus 10 for aging polyethylene foam under pressure according to the invention is shown. The polyethylene foam to be aged is placed in chambers 12, 14 through doors, (not shown). Valves 16, 18 selectively communicate a respective chamber with the atmosphere. Valve 20 selectively communicates the two chambers. Valves 22, 24 selectively communicate a respective chamber with air compressor 26, only one valve communicating a respective chamber with the compressor at any one time.

In operation, polyethylene foam to be aged is placed in chamber 12. Valves 16 and 20 are closed to isolate chamber 12 from the atmosphere and from chamber 14 respectively. Valve 22 is opened to communicate compressor 26 with chamber 12 while valve 24 is closed. Valve 18 may be left open or closed when starting up apparatus 10. Compressor 26 is actuated to build and maintain air pressure in chamber 12 at a predetermined level for a predetermined period of time corresponding to the parameters necessary to age the polyethylene foam. While pressure is being built and maintained in chamber 12, other foam to be aged is placed in chamber 14 and valve 18 is closed to isolate chamber 14 from the atmosphere. After the requisite aging period in chamber 12, valve 20 is opened whereby the pressure in chamber 14 is permitted to equalize with the pressure in chamber 12 through valve 20. After this has occurred, valves 20 and 22 are closed, valve 24 is opened and compressor 26 builds and maintains air pressure in chamber 14 at a predetermined level for a predetermined period of time corresponding again to the parameters necessary to age the polyethylene foam. After valve 20 has been closed, valve 16 is opened to vent chamber 12 to the atmosphere. During the time that chamber 14 is pressurized, the aged foam is removed from chamber 12 and additional foam to be aged is placed therein for another aging cycle. After a predetermined time has elapsed, valve 16 is closed, and valve 20 is opened to equalize the pressure between the two chambers. Thereafter, valves 24 and 20 are closed, and valve 22 is opened and compressor 26 again builds pressure in chamber 12 to start another cycle during which valve 18 is opened and the foam removed from chamber 14.

Means for controlling the opening and closing of the valves in proper sequence are well known to those skilled in the art. Accordingly, such control means are shown in the FIG. 1 in the form of a block referenced by 28.

In accordance with the invention, apparatus 10 is operative to continuously age foam and to utilize a portion of the pressure already used in previous cycles thus saving time and conserving energy. Accordingly, apparatus 10 not only has the advantage of continuous operation whereby costs are reduced and throughput increased, but also the advantage of lower energy consumption in that the pressure of prior cycles is reduced and compressor 26 need not build pressure from atmospheric pressure for each cycle.

While particular reference has been made to extruded foams using a gaseous expansion agent, it is to be understood that in accordance with the present invention the aging period of foams produced by other methods employing a gaseous expansion agent can also be reduced and it is intended that such foams be covered by the disclosure and claims herein. In the description of the preferred embodiment, particular reference has been made to polyethylene. However, other polyolefin foams such as polypropylene are intended to be covered by the claims and disclosure herein. It is also to be understood that foams of thicknesses other than those disclosed in the examples are intended to be covered by the claims and disclosure herein, as are foams of varying density.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing from the spirit and scope of the invention.

What is claimed is:

1. A method for reducing the aging period of extruded foam produced with a molten thermoplastic resin having a volatile hydrocarbon gaseous expansion agent injected under pressure and extruded to ambient pressure and temperature which comprises subjecting the extruded and expanded foam to a pressure of from about 50 to about 750 psig of a gas which is inert with respect to the foam at substantially ambient temperature and within a period of two weeks after extrusion and foaming for a period of time of from about 24 to about ½ hours.

2. The method of claim 1 wherein the foam is subjected to a pressure of from about 90 to about 500 psig for a period of time of from about 10 to 1 hours.

3. The method of claim 1 wherein the method comprises reducing the aging period of a polyolefin foam and the gas is selected from the group consisting of air and nitrogen and combinations thereof.

4. The method of claim 1 wherein the method comprises reducing the aging time of polyethylene foam and the gas is selected from the group consisting of air and nitrogen and combinations thereof.

5. A continuous method for reducing the aging period after foaming of extruded thermoplastic foam produced with a volatile hydrocarbon gaseous expansion agent which comprises:
 (a) placing a first batch of foam to be aged in a first chamber within a period of two weeks from the time it is extruded;
 (b) subjecting the foam in said first chamber to a gas pressure of from about 50 to about 750 psig for from about 24 to about ½ hours;
 (c) placing a second batch of foam to be aged in a second chamber within a period of two weeks from the time it is extruded;
 (d) after the expiration of a predetermined period of time between said about 24 and about ½ hours, equalizing the pressure between the two chambers by establishing gaseous communication between them and thereafter again isolating the chambers from each other;
 (e) subjecting the second chamber to a gas pressure of from about 50 to about 750 psig for from about 24 to about ½ hours; and
 (f) removing the aged foam from the first chamber.

6. The method of claim 5 wherein the gas pressure of paragraphs (b) and (e) is from about 90 to about 500 psig and the foam is subjected thereto for from about 10 to about 1 hours.

7. The method of claim 5 wherein the method comprises reducing the aging period of a polyolefin foam and the gas is selected from the group consisting of air and nitrogen and combinations thereof.

8. The method of claim 5 wherein the gas is at ambient temperature.

9. The method of claim 5 wherein the method comprises reducing the aging time of polyethylene foam and the gas is selected from the group consisting of air and nitrogen and combinations thereof.

* * * * *